United States Patent
Arlt et al.

(10) Patent No.: US 11,511,791 B2
(45) Date of Patent: Nov. 29, 2022

(54) CANTILEVERED WORM GEAR ASSEMBLY WITH BRAKE BUSHING

(71) Applicant: Steering Solutions IP Holding Corporation, Saginaw, MI (US)

(72) Inventors: George E. Arlt, Midland, MI (US); Joel A. Bickel, Millington, MI (US); Stanley J. Iseler, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 202 days.

(21) Appl. No.: 17/110,417

(22) Filed: Dec. 3, 2020

(65) Prior Publication Data

US 2021/0171091 A1 Jun. 10, 2021

Related U.S. Application Data

(60) Provisional application No. 62/944,700, filed on Dec. 6, 2019.

(51) Int. Cl.
*B62D 5/00* (2006.01)
*B62D 5/04* (2006.01)

(52) U.S. Cl.
CPC ........... *B62D 5/006* (2013.01); *B62D 5/0403* (2013.01)

(58) Field of Classification Search
CPC ...... B62D 5/006; B62D 5/0403; B62D 5/001; B62D 5/0454; B62D 5/0409
See application file for complete search history.

(56) References Cited

U.S. PATENT DOCUMENTS

| | | | |
|---|---|---|---|
| 11,254,349 B2 * | 2/2022 | Palmer | F16H 1/16 |
| 2006/0117889 A1 * | 6/2006 | Segawa | H02K 7/081 |
| | | | 74/425 |
| 2017/0320515 A1 * | 11/2017 | Levesque | B62D 5/006 |
| 2019/0061805 A1 * | 2/2019 | Buchacz | B62D 5/0403 |
| 2021/0070361 A1 * | 3/2021 | Erickson | B62D 5/001 |
| 2021/0108705 A1 * | 4/2021 | Palmer | F16H 57/021 |

FOREIGN PATENT DOCUMENTS

| | | | | |
|---|---|---|---|---|
| WO | WO-9911502 A1 * | 3/1999 | | B62D 5/0409 |
| WO | WO-2018060701 A1 * | 4/2018 | | B62D 5/0403 |
| WO | WO-2019002888 A1 * | 1/2019 | | B62D 5/0403 |
| WO | WO-2020115920 A1 * | 6/2020 | | B62D 15/0215 |
| WO | WO-2020184858 A1 * | 9/2020 | | B62D 5/001 |

* cited by examiner

*Primary Examiner* — Jacob B Meyer
*Assistant Examiner* — Ryan Hardy
(74) *Attorney, Agent, or Firm* — Dickinson Wright PLLC

(57) ABSTRACT

A steering assembly including an electric motor, and a motor shaft coupled to and extending from the electric motor to an end. The motor shaft is rotatable about a motor shaft axis by the motor. The steering assembly further includes a friction pad at the end of the motor shaft, where the friction pad has a coefficient of friction configured to resist rotation of the motor shaft.

20 Claims, 4 Drawing Sheets

CANTILEVERED WORM GEAR ASSEMBLY WITH BRAKE BUSHING

CROSS-REFERENCE TO RELATED APPLICATION

This application claims the benefit of priority to U.S. Provisional Patent Application No. 62/944,700, filed Dec. 6, 2019, the disclosure of which is incorporated by reference herein in its entirety.

BACKGROUND OF THE INVENTION

As technology advances in the vehicle industries, direct mechanical linkages between the steering wheel and tires are being replaced with steer-by-wire (SbW) assemblies. SbW assemblies may include a hand-wheel actuator (HWA) and road-wheel actuator (RWA) which cooperate with one another, through electrical communications (e.g., wires, sensors, and a central processing unit), to control steering of the automobile. More specifically, sensed movement of and between a hand-wheel and/or tires is translated through electrical communication between the HWA and the RWA. In turn, the respective HWA and RWA cause or restrict steering movement of the respective hand-wheel and/or tires. Some HWAs and RWAs may include a worm/worm gear reduction assembly which cause or restrict movement of the respective hand-wheel and/or tires. In certain instances, the worm/worm gear reduction assembly may include a cantilevered worm.

Low coefficient of friction bushings or bearings are primarily designed for use in prior art electronic power steering (EPS) systems, where an assist torque is applied. In EPS systems, a low friction bushing or bearing is advantageous as it increases the efficiency in the EPS system. The low friction bushings or bearings, however, are not advantageous in SbW systems where a resistive torque is typically used. SbW system employing such low friction bushing require a larger motor to apply a resistive torque and resist rotation of a hand-wheel and/or tires. Currently, these SbW systems require increased power and packaging space in a vehicle. The present disclosure relates to a SbW system that utilizes less power and packaging space in a vehicle.

SUMMARY OF THE DISCLOSURE

According to one aspect of the disclosure, a steering assembly includes an electric motor. A motor shaft is coupled to and extends from the electric motor to an end. The motor shaft is rotatable about a motor shaft axis by the motor. A friction pad is positioned at the end of the motor shaft, and the friction pad has a coefficient of friction configured to resist rotation of the motor shaft.

According to one aspect of the disclosure, a steering assembly includes a housing and an electric motor coupled to and disposed in the housing. The motor shaft is rotatable about a motor shaft axis by the motor. A friction pad is positioned at the end of the motor shaft, and the friction pad has a coefficient of friction configured to resist rotation of the motor shaft.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, the invention will be described with reference to specific embodiments without limiting the same. It is to be understood that the disclosed embodiments are merely illustrative of the present disclosure and may be embodied in various and alternative forms. Various elements of the disclosed embodiments may be combined or omitted to form further embodiments of the present disclosure. The Figures are not necessarily to scale, as some features may be exaggerated or minimized to show details of particular components. Therefore, specific structural and functional details disclosed herein are not to be interpreted as limiting, but merely as a representative basis for teaching one skilled in the art to employ the embodiments of the present disclosure, and variation thereof.

Figure 3:
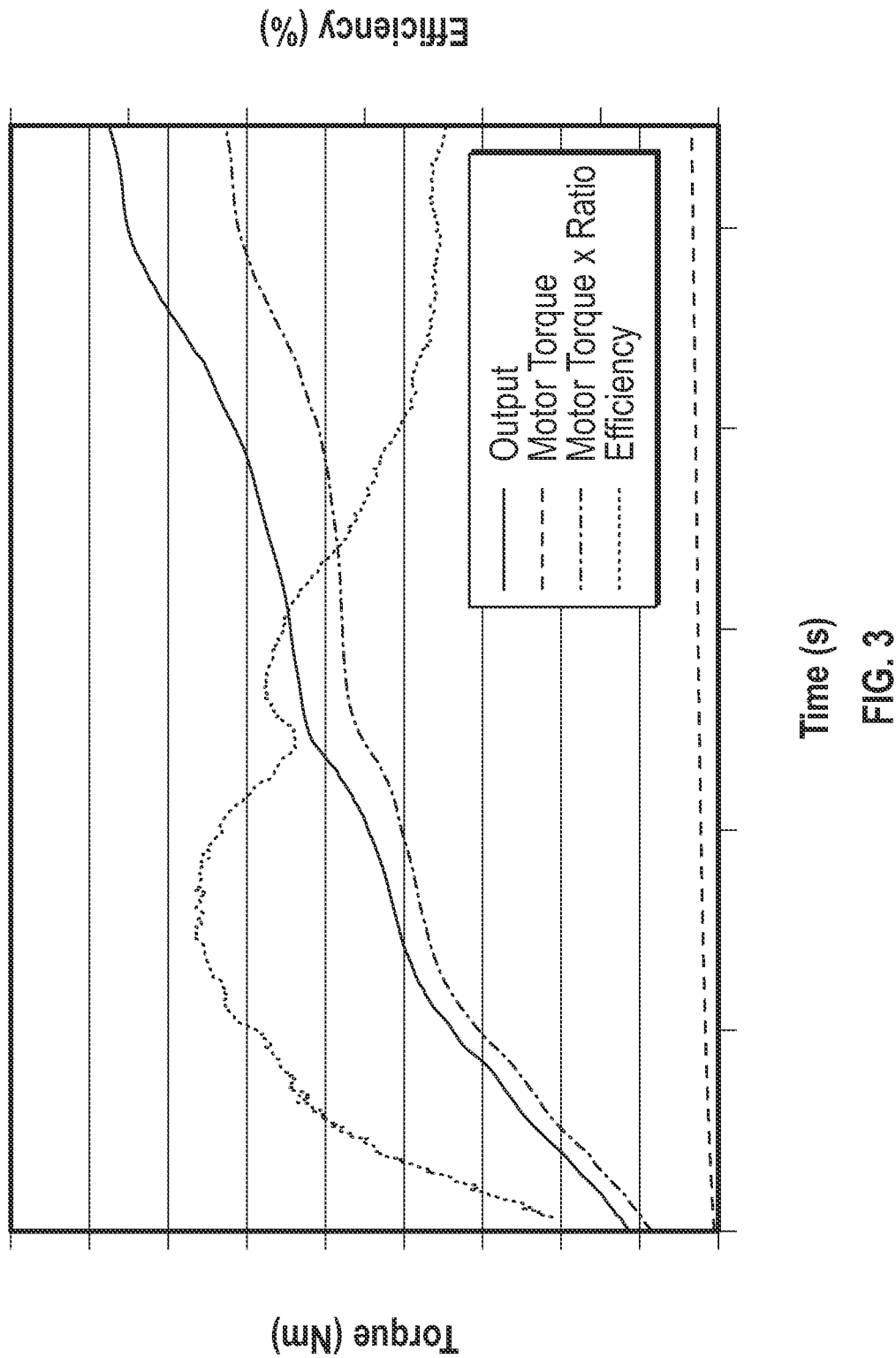
FIG. 3 is a graph illustrating the efficiency, based on an input torque applied to a steering shaft and a resistance torque output by a motor, of a SbW assembly employing a bushing with a high coefficient of friction.
Figure 4:
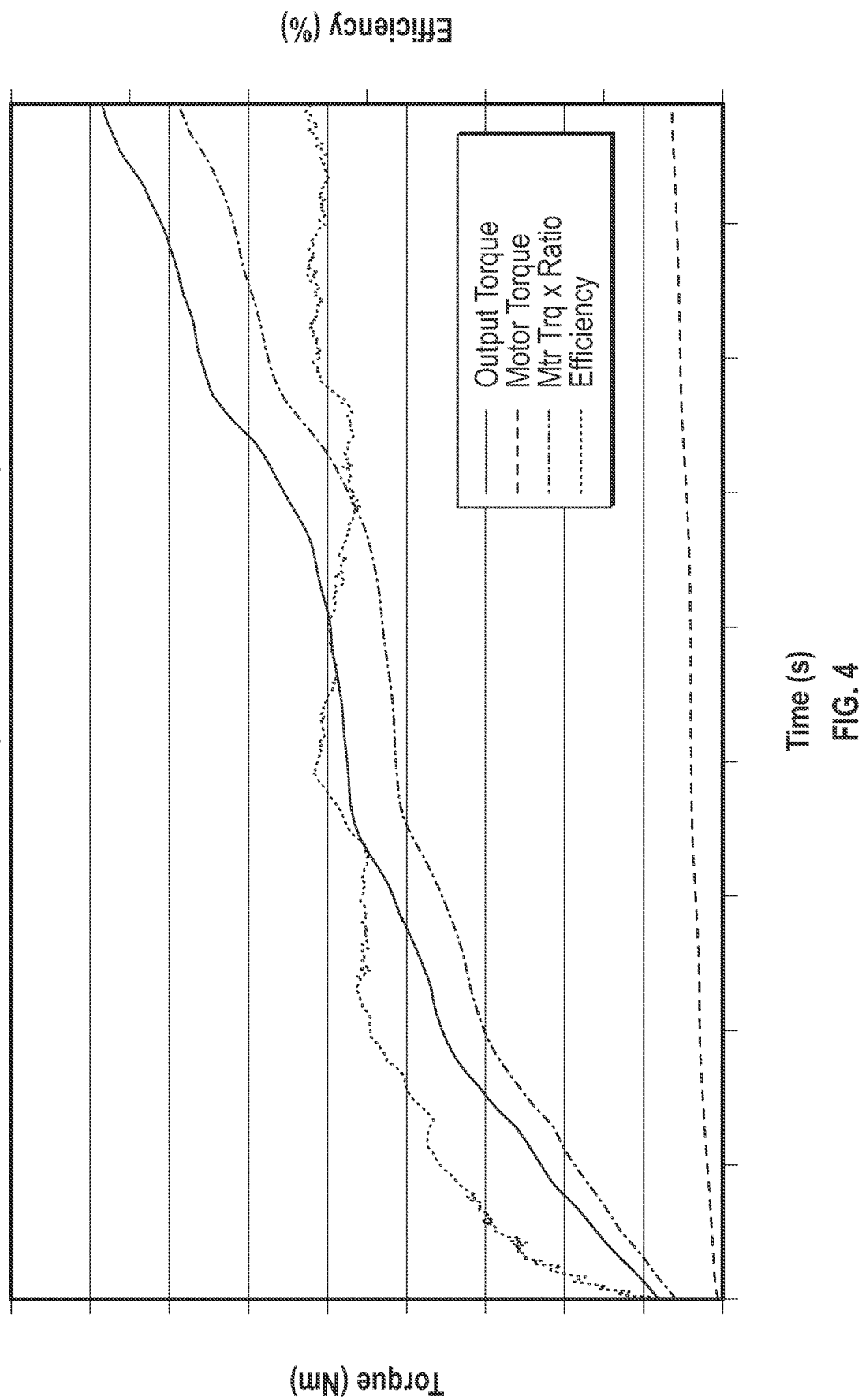
FIG. 4 is graph illustrating the efficiency, based on an input torque applied to a steering shaft and a resistance torque output by a motor, of a SbW assembly employing a bushing with a low coefficient of friction.

The present disclosure provides a steer-by-wire (SbW) that utilizes less power and packaging space in a vehicle. SbW systems, such as the one disclosed herein, provide a resistive torque to resist rotation of, for example, a motor shaft of a HWA. The SbW assembly of the present disclosure provides an advantage over current SbW systems by employing a bushing or bearing with a high coefficient of friction, or a coefficient of friction large enough, to reduce the efficiency of the SbW system at the bushing or bearing. As used herein, and unless otherwise defined, efficiency of the SbW system is calculated based on an input torque applied to a hand-wheel/hand-wheel shaft and an output (or resistance torque) torque applied by a motor to a motor shaft. This reduction in efficiency reduces the required output (i.e., power consumption and torque) from the motor of the SbW system of the present disclosure (see e.g., FIG. 3) compared to motors of current SbW systems employing low coefficient of friction bushing or bearings (see e.g., FIG. 4). With reduced motor torque and power consumption, some components of the SbW system experience lower stress. Moreover, the smaller motors employed in the SbW system disclosed herein is favorable for reducing the cost and packaging of the SbW system.

Figure 1:
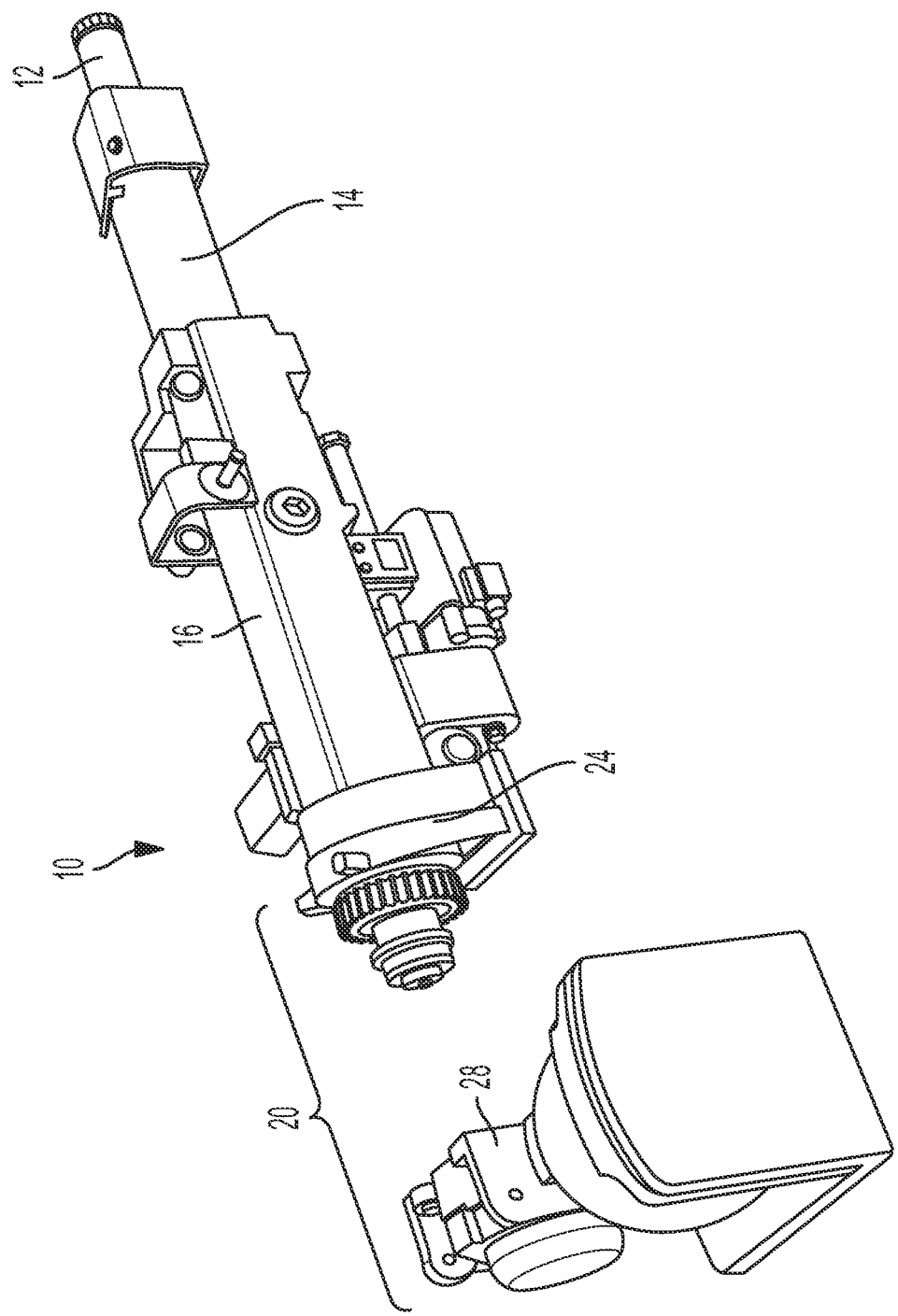
FIG. 1 is a perspective view of a portion of a steer-by-wire (SbW) assembly.

With reference now to FIG. 1, a portion of a steer-by-wire (SbW) assembly or system of the present disclosure is illustrated. Specifically, a steering column assembly of the SbW assembly is illustrated and generally referenced with numeral 10. The steering column assembly 10 includes a steering shaft 12 that is operatively coupled at one end to a steering input device, such as a steering wheel. The steering column assembly 10 also couples at an opposite end and to one or more intermediate components, such as a hand-wheel actuator (HWA) assembly 20 (see FIG. 2), that are configured to electronically communicate with a road-wheel actuator (RWA) to cause or restrict movement of tires (or roadwheels). In the embodiment illustrated, the steering shaft 12 is at least partially surrounded by an upper jacket 14 that extends within a lower jacket 16. However, one of skill in the art should readily appreciate the steering shaft 12 may be any other steering shaft, known, or to be developed, in the art.

Figure 2:
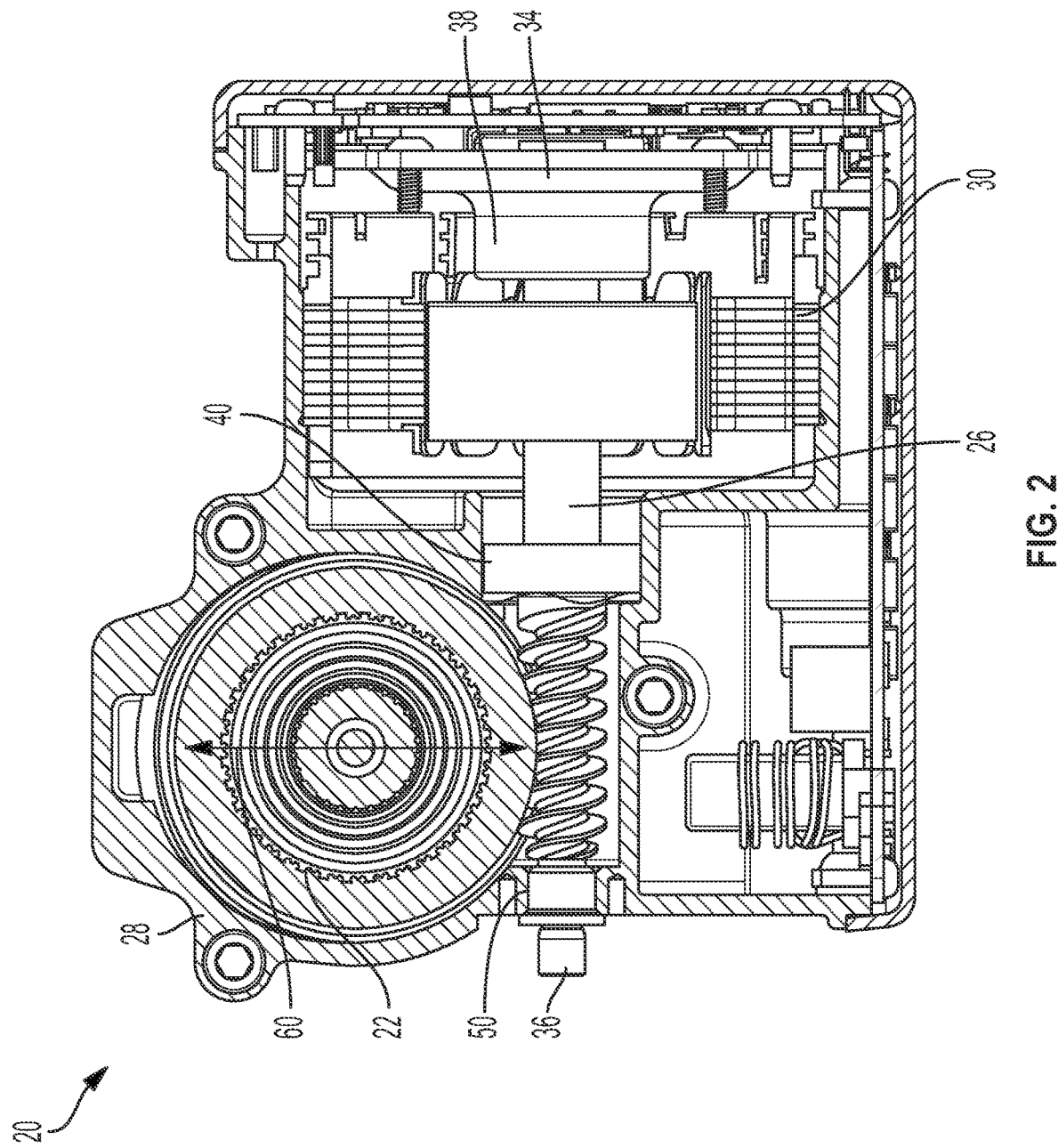
FIG. 2 is an elevational view of a worm/worm gear assembly of the SbW assembly.

Referring now to FIG. 2, with continued reference to FIG. 1, a HWA assembly 20 is provided to cooperate with steering inputs from an operator of the vehicle to control travel of the vehicle. Specifically, steering maneuvers, or rotation of, a hand-wheel by the operator, is translated through the steering column assembly 10, to the HWA assembly 20, which cooperates with the RWA to control the travel or steering of the vehicle. The HWA assembly 20 includes a worm/worm gear 22 at least partially disposed within a first housing 24 (FIG. 1). In the illustrated embodiment, a portion of the lower jacket 16 is the first housing 24, as they are an integrally formed part. The HWA assembly 20 also includes a worm 26 that is at least partially disposed within a second housing 28 that also houses an electric actuator, such as an electric motor 30. Although the worm 26 and the worm gear 22 are described above and illustrated in the Figures as being located in different housings, it is to be appreciated that a single housing may be employed to at least partially contain both the worm 26 and the worm gear 22.

A controller, not illustrated in the FIGS., may cooperate with the motor 30 to cause operation of the motor 30. More specifically, the controller and motor 30 may be in electrical communication with one another, i.e., connected via wires, etc., wherein the controller is configured to provide an electric current to the motor 30 that is proportional to the output of the motor 30.

The electric motor 30 includes a motor shaft that rotates during operation of the electric motor 30. The motor shaft is integrated with the worm 26 to be a single, unitary component (i.e., shaft) extending as a rotatable output member of the electric motor 30. Therefore, the worm 26 and the motor shaft may also be referred to herein as a shaft and designated with numeral 26. However, in certain alternative embodiments, the worm 26 and the motor shaft may be coupled to one another, i.e., non-integral. Threads of the worm 26 are arranged to engage the worm gear 22 such that rotation of the worm 26 causes rotation of the worm gear 22. The worm gear 22 is operatively coupled to the steering shaft 12 to provide a torque to the steering shaft 12, and in turn, the hand-wheel, to assist or restrict rotation of the same.

The shaft extends axially from a first end 34 to a second end 36. The motor shaft portion of the shaft 26 is located closer to the first end 34 than the second end 36. The worm portion of the shaft 26 is located closer to the second end 36 of the shaft 26. A first bearing 38 is located proximate the motor shaft portion of the shaft 26 to support the shaft 26. In other words, the first bearing 38 is locater closer to the first end 34 of the shaft than the second end 36. A second bearing 40 is axially spaced from the first bearing 38 and is located further away from the first end 34 of the shaft, when compared to the distance between the first bearing 38 location and the first end 34. The second bearing 40 cantilevers the worm section (i.e., portion of shaft 26 with threads) of the shaft 26.

Due to the cantilever of the worm section of the shaft 26, the second end 36 of the shaft 26 is permitted to deflect in response to rotation of the steering shaft 12, or other mechanical forces that may act on the HWA assembly 20 or shaft 26. To limit deflection of the shaft 26, a friction pad is positioned proximate, or at, the second end 36. The friction pad has a coefficient of friction configured to resist, or stop, rotation of the shaft 26. In certain embodiments, and as illustrated in the FIGS., the friction pad may be a bushing 50 surrounding a portion of the shaft 26 proximate the second end 36. The friction pad may also be a bearing or high coefficient of friction lubricant. A clearance may be present between the bushing 50 and the shaft 26 to avoid overconstraining the assembly. However, the clearance is tuned to avoid contact between the limiter bushing 50 and the shaft 26 during normal operating conditions, but to allow contact during extreme operational conditions, such as when the shaft 26 deflects, to ensure that the worm shaft 26 does not break upon significant deflection.

As discussed above, bushings in many SbW systems employ a bushing with a low coefficient of friction. In these SbW systems, and with references to FIG. 4, the efficiency of the SbW system reaches a peak state. Specifically, the low coefficient of friction bushing functions to limit the reduction in efficiency of the motor shaft. In response, the work of the motor proportionally increases as the input torque applied to the hand-wheel shaft increase. In addition, the efficiency of the motor 30 decreases because of the increased work, which results in the SbW system requiring larger power draw from the electrical system of the vehicle and requiring larger motors. To assist the motor 30 in restricting rotation of the steering shaft 12, and to increase the efficiency of the motor 30, the efficiency of the SbW assembly may be decreased. Specifically, the friction pad may be a bushing 50 with a high coefficient of friction that provides additional resistance (i.e., apply an additional resistance torque) to shaft 26 when it deflects and contacts the friction pad. In turn, the friction pad decreases the efficiency, as measured by an input torque applied to a hand-wheel and a resistance torque applied by the motor to the motor shaft, of the SbW system. The friction may also comprise a high friction material such as a high mu grease, pad, or any other liquid or material.

The friction pad, such as bushing 50, may further be configured to act as a brake to slow or resist rotation, or as a stop. In such an embodiment, when the steering shaft 12 is deflected a desired distance, the coefficient of friction between the bushing 50 and the steering shaft 12 may be configured to stop relative rotation of the steering shaft 12, and in turn, the hand-wheel. Once again, such a design reduces the output of the motor 20, and may even eliminate output from the motor 20. Further yet, the distance between the bushing 50 and the worm of shaft 26 may be configured to provide contact between the bushing 50 and the shaft 26, when the shaft 26 deflects a certain distance. More specifically, the positioning of the bushing 50 in the housing 28, 24 may be varied to achieve a desired distance between the bushing 50 and the worm of shaft 26.

The addition of the bushing 50 with a high coefficient of friction allows for greater reduction in the size of the motor 30, and the HWA assembly 20. The size reduction is achieved as the output of the motor 30 is reduced at high torque levels, which allows for the use of smaller sized motors 30. The reduced size of the motor 30 also provides a cost reduction to the manufacture of the motor 30, and, the vehicle. Further yet, the reduced size means reduced packaging space for the motor 30, and the HWA assembly 20, in the vehicle.

Although the controlled clearance for the shaft 26 is described above as being facilitated by the bushing 50, it is to be understood that an alternative embodiment does not include a bushing 50 and instead relies on the structure of the surrounding housing and friction between the housing and the shaft 26 to provide the same effect as bushing 50.

The embodiments described herein may be combined with a linear slide capability of the HWA assembly 20. Linear sliding in the direction referenced with numeral 60 may further vary the friction of the HWA 20, as described in U.S. patent application Ser. No. 16/598,827, filed on Oct. 10, 2019, the disclosure of which is incorporated by reference herein in its entirety.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering assembly comprising:
   an electric motor;
   a motor shaft coupled to and extending from the electric motor to an end, and the motor shaft is rotatable about a motor shaft axis by the electric motor; and
   a friction pad positioned at the end of the motor shaft, the friction pad having a coefficient of friction configured to resist rotation of the motor shaft.

2. The steering assembly of claim 1, wherein the friction pad is a bushing.

3. The steering assembly of claim 2, wherein the bushing surrounds the end of the motor shaft.

4. The steering assembly of claim 1, wherein the friction pad surrounds the end of the motor shaft.

5. The steering assembly of claim 1, wherein the motor shaft has a worm portion.

6. The steering assembly of claim 5, wherein the worm portion is integral with the motor shaft.

7. The steering assembly of claim 1, wherein the electric motor and motor shaft are disposed in a housing.

8. The steering assembly of claim 7, wherein a steering shaft engages a portion of the housing and the motor shaft.

9. The steering assembly of claim 8, wherein the steering shaft has a worm gear that engages the motor shaft, whereby rotation of the motor shaft about the motor shaft axis resists rotation of the steering shaft.

10. The steering assembly of claim 8, wherein the steering shaft has a worm gear that engages a worm portion of the motor shaft.

11. The steering assembly of claim 7, wherein the friction pad is coupled to the housing.

12. The steering assembly of claim 7, wherein the friction pad is defined by the housing.

13. The steering assembly of claim 12, wherein the friction pad is integral with the housing.

14. A steering assembly comprising:
    a housing;
    an electric motor coupled to and disposed in the housing;
    a motor shaft coupled to and extending from the electric motor to an end, and the motor shaft is rotatable about a motor shaft axis by the motor; and
    a friction pad positioned at the end of the motor shaft, the friction pad having a coefficient of friction configured to resist rotation of the motor shaft.

15. The steering assembly of claim 14, wherein the friction pad is a bushing.

16. The steering assembly of claim 15, wherein the bushing surrounds the end of the motor shaft.

17. The steering assembly of claim 14, wherein the friction pad surrounds the end of the motor shaft.

18. The steering assembly of claim 14, wherein the motor shaft has a worm portion.

19. The steering assembly of claim 18, wherein the worm portion is integral with the motor shaft.

20. The steering assembly of claim 7, wherein a steering shaft engages a portion of the housing and the motor shaft, whereby rotation of the motor shaft about the motor shaft axis resists rotation of the steering shaft.

* * * * *